(12) United States Patent  (10) Patent No.: US 7,725,526 B1
Kraft  (45) Date of Patent: May 25, 2010

(54) SYSTEM AND METHOD FOR WEB BASED SHARING OF SEARCH ENGINE QUERIES

(75) Inventor: Reiner Kraft, Gilroy, CA (US)

(73) Assignee: International Business Machines Corporation, Armonk, NY (US)

( * ) Notice: Subject to any disclaimer, the term of this patent is extended or adjusted under 35 U.S.C. 154(b) by 2745 days.

(21) Appl. No.: 09/602,490

(22) Filed: Jun. 23, 2000

(51) Int. Cl.
*G06F 15/16* (2006.01)

(52) U.S. Cl. .................. 709/203; 709/217; 707/10; 705/14

(58) Field of Classification Search .............. 707/3–7, 707/10, 200–201; 709/203, 217, 219; 705/14
See application file for complete search history.

(56) References Cited

U.S. PATENT DOCUMENTS

| | | | | |
|---|---|---|---|---|
| 5,628,004 | A | * | 5/1997 | Gormley et al. .......... 707/104.1 |
| 5,806,059 | A | * | 9/1998 | Tsuchida et al. .............. 707/2 |
| 5,826,261 | A | * | 10/1998 | Spencer .................... 707/5 |
| 5,862,223 | A | * | 1/1999 | Walker et al. ............. 705/50 |
| 6,138,120 | A | * | 10/2000 | Gongwer et al. ........... 707/10 |
| 6,169,986 | B1 | * | 1/2001 | Bowman et al. ............. 707/5 |
| 6,285,998 | B1 | * | 9/2001 | Black et al. ............... 707/4 |
| 6,430,558 | B1 | * | 8/2002 | Delano .................... 707/5 |

(Continued)

FOREIGN PATENT DOCUMENTS

JP          05-061913          3/1993

(Continued)

OTHER PUBLICATIONS

UK Search Report dated Feb. 20, 2002 for Application No. GB 0112512.9.

*Primary Examiner*—Lashonda T Jacobs
(74) *Attorney, Agent, or Firm*—Jon A. Gibbons; Fleit Gibbons Gutman Bongini & Bianco P.L.

(57) ABSTRACT

While a user browses through a network, the present invention monitors and detects search queries. As a user enables queries to search for documents containing information necessary to the completion of a task, hobby, entertainment or to improve his or her general knowledge, the present invention detects that a query has been enabled and stores the query for later presentation to a user in an integrated browser list window. If a user wishes to share queries with other users in a global database, he or she must select a query string for sharing in an integrated browser list window. The query is stored locally and forwarded across a communication network to a hub processing unit for permanent storage in a global database accessible by a plurality of users. Also, the user can add annotations to the search query prior to its being forwarded to the hub processing unit. The hub processing unit in coordination with the global database organizes and manages the storage of selected shared query. Once stored in the global database, other users can benefit from the intelligence, work and experience of others by searching through categories of search queries as well as simply browsing through them. This is accomplished by a second user entering categorical data to his local graphical user interface which communicates with a search and retrieval program. The search and retrieval program returns a grouping or listing of headlines related to the category selected by the second user.

23 Claims, 12 Drawing Sheets

U.S. PATENT DOCUMENTS

| | | | |
|---|---|---|---|
| 6,460,034 B1 * | 10/2002 | Wical | 707/5 |
| 6,484,162 B1 * | 11/2002 | Edlund et al. | 707/3 |
| 6,539,377 B1 * | 3/2003 | Culliss | 707/5 |
| 6,549,941 B1 * | 4/2003 | Jaquith et al. | 709/219 |
| 6,671,681 B1 * | 12/2003 | Emens et al. | 707/5 |

FOREIGN PATENT DOCUMENTS

| | | |
|---|---|---|
| JP | 10-063685 | 3/1998 |
| JP | 10-187525 | 7/1998 |
| JP | 11-045267 | 2/1999 |
| JP | 11-191110 | 7/1999 |
| JP | 11-249993 | 9/1999 |
| JP | 2000-057147 | 2/2000 |
| JP | 2000-123030 | 4/2000 |
| JP | 2000-155764 | 6/2000 |
| WO | WO 01/16807 | 3/2001 |
| WO | WO 01/16807 A1 * | 3/2001 |

* cited by examiner

Fig.4 Information Processing Unit Functional Overview

Fig.5 User Interaction with Hub Processing Unit

Fig.6 Query Analyzer Functional Overview

Fig. 8 Web Server Component Functional Overview

Fig. 9 Query Management Unit Functional Overview

Fig. 10 Representation Manager Functional Overview

SYSTEM AND METHOD FOR WEB BASED SHARING OF SEARCH ENGINE QUERIES

PARTIAL WAIVER OF COPYRIGHT

All of the material in this patent application is subject to copyright protection under the copyright laws of the United States and of other countries. As of the first effective filing date of the present application, this material is protected as unpublished material. However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

CROSS-REFERENCE TO RELATED APPLICATIONS

Not Applicable

FIELD OF THE INVENTION

This invention relates to Internet Search Technology and E-Commerce and more particularly to an improved method and apparatus for users to share their best search engine queries.

BACKGROUND OF THE INVENTION

Database systems store enormous amounts of information that can be accessed by users for identification and retrieval of valuable documents that contain data, text, audio and video information. A typical example of a database system is shown in FIG. 1. Information processing units (101a to 101n) can be any of the following: personal computers (DOS, WINDOWS or Macintosh, Linux machines), workstations, a client, a dumb terminal or equivalent. Hub processing units (102a to 102y) can be any of the following: a server, a master, a database controller or equivalent. Network (100) can be any of the following: a token ring network, a star network, a telecommunication switching network, a local area network (LAN), a wide area network (WAN), a corporate intranet, the Internet or equivalent. Information processing units (101a to 101n) are in communication with hub processing units (102a to 102y) via network 100. The sharing of data across network 100 is accomplished by computer search programs (103a to 103x) operating in conjunction with the hub processing units (102a to 102y). The search programs can be located on the hub processing units themselves or on another processing units that are not shown. In addition, a user employs a graphical user interface (GUI 104a to 104n) that permits him or her to submit search queries across network 100 to the hub processing units.

Upon reception of the search query, the hub processing units forward the request to the search programs (103a to 103x) for completion of the transaction. As is well known, search programs provide Boolean Operators (AND, OR NOT) to help build more sophisticated queries in order to narrow down the search result set. These Boolean Operators are used to provide the various permutations to the search programs (103a to 103x) which uses these to locate pertinent documents. Once in possession of the search query, the search programs compare the requested search parameters against documents stored in databases (105a to 105z). Finding words or phrases that compare favorably with the search query, the search programs return a list of relevant documents to the information processing units (101a to 101n) as well as library information such as type of document, location and highlighted words or phrases indicating the flags that caused the search program to retrieve the particular document.

When the search results are loaded into the graphical user interface, the user reviews the first set of headlines and or documents returned. Because of the large number of documents found and because the first set of search results do not usually provide documents particularly pertinent to the user's needs, he or she ordinarily reexamines his search strategy. Typically, additional words and phrases as well as selection of terms that more closely parallel the desired concepts are reformulated into a new query; this process can be time consuming and tedious to a user. Therefore, because of the increasing size of databases and the astronomical number of documents being made available to users, it becomes more and more difficult for a user to locate in a timely fashion documents that are of significant importance to his or her study, employment and/or enjoyment.

In particular, this invention addresses several problems related to Internet based searching. First, the construction of a "good" query string can take a considerable amount of time. Mostly, users are able to specify what they are looking for using natural language. For instance, "I'm looking for an article about Maine Coon Cats which describes theories about their origin" could be a description for a search query. Possible simple search queries could be any permutation of the string "Maine Coon Cats Origin". As is well known, Search Engines provide Boolean Operators (AND, OR NOT) to help build more sophisticated queries in order to narrow down the search result set. The Boolean Operators are used to provide the various permutations to an Internet Search Engine which uses these to locate pertinent documents to the "Maine Coon Cats Origin" string.

Second, there are many Search Engines available on the World Wide Web. A user could use HotBot (http://www.hotbot.com) or AltaVista (http://www.altavista.com), or some other Search Engine. There are also Meta Search Engines available, which are used to search many popular Search Engines simultaneously. These Meta Search Engines then merge the search results from a plurality of Search Engines and present the merged results to a user. However, some of the engines may provide no results whatsoever whilst others might provide a better result; hence, it is difficult to determine which engine provides a reasonable result set. Also, this process can take a considerable amount of time. Therefore, it would be desirable to reuse existing queries from other users. Thus, one benefits from the intelligence and hard work of other users and one can find information faster. Additionally, some mechanism or incentive must be provided to users so that they would be willing to submit their queries for subsequent reuse by other users.

SUMMARY OF THE INVENTION

While a user browses through a network, the present invention monitors and detects search queries. As a user enables queries to search for documents containing information necessary to the completion of a task, hobby, entertainment or to improve his or her general knowledge, the present invention detects that a query has been enabled and stores the query for later presentation to a user in an integrated browser list window. If a user wishes to share queries with other users in a global database, he or she must select a query string for sharing in an integrated browser list window by pressing a button with a mouse click indicating "share last query". The query is stored locally and forwarded across a communication network to a hub processing unit for permanent storage in a global database accessible by a plurality of users. Also, the user can add annotations to the search query prior to its being forwarded to the hub processing unit. The hub processing unit in coordination with the global database organizes and manages the storage of a selected shared query. Once stored in the global database, other users can benefit from the intelligence, work and experience of others by searching through categories of search queries as well as simply browsing through them. This is accomplished by a second user entering categorical data to his local graphical user interface which communicates with a search and retrieval program. The search and retrieval program returns a grouping or listing of headlines related to the category selected by the second user.

One can readily see that the time required for the second user to locate relevant information is considerably less than that of the first user who has to navigate through multiple search programs, a trial and error technique of refining search words and phrases and also network traffic that slows down his or her efforts and leads to frustration. Essentially, the first user did most of the "pioneer" work by building a complex query string and trying out several search programs. The second user simply reused the query string. Accordingly, the present invention allows expertise to be shared in the form of search engine queries which will decrease searching time.

In another embodiment, the present invention is a portal site which allows users to browse areas of interest and/or advertisers using it to place targeted ads, shopping opportunities or equivalent. The present invention thereby shifts the burden of link maintenance to the search engine provider. The invention provides the most recent set of matching search result items even if resources moved their location and more.

In another embodiment, because the overall system depends on the volunteer work of users who share their queries. Thus there has to be some motivation for people to make their work available. A reward system which consists of points awarded to each user who submits a query string. In addition to the points awarded for submission of a query string, a user receives points each time another user uses the query string. These points can be later used to purchase online goods and more.

In another embodiment, the use of web based communities fosters the sharing and exchanging web based expertise. The system can be expanded to not only share queries but also URL's and more. In this manner, the present invention provides a system and method for the selective sharing of search queries along with the awarding of sharing points to an altruistic user.

BRIEF DESCRIPTION OF THE FIGURES

The subject matter which is regarded as the invention is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION OF THE PREFERRED EMBODIMENTS

Figure 1:
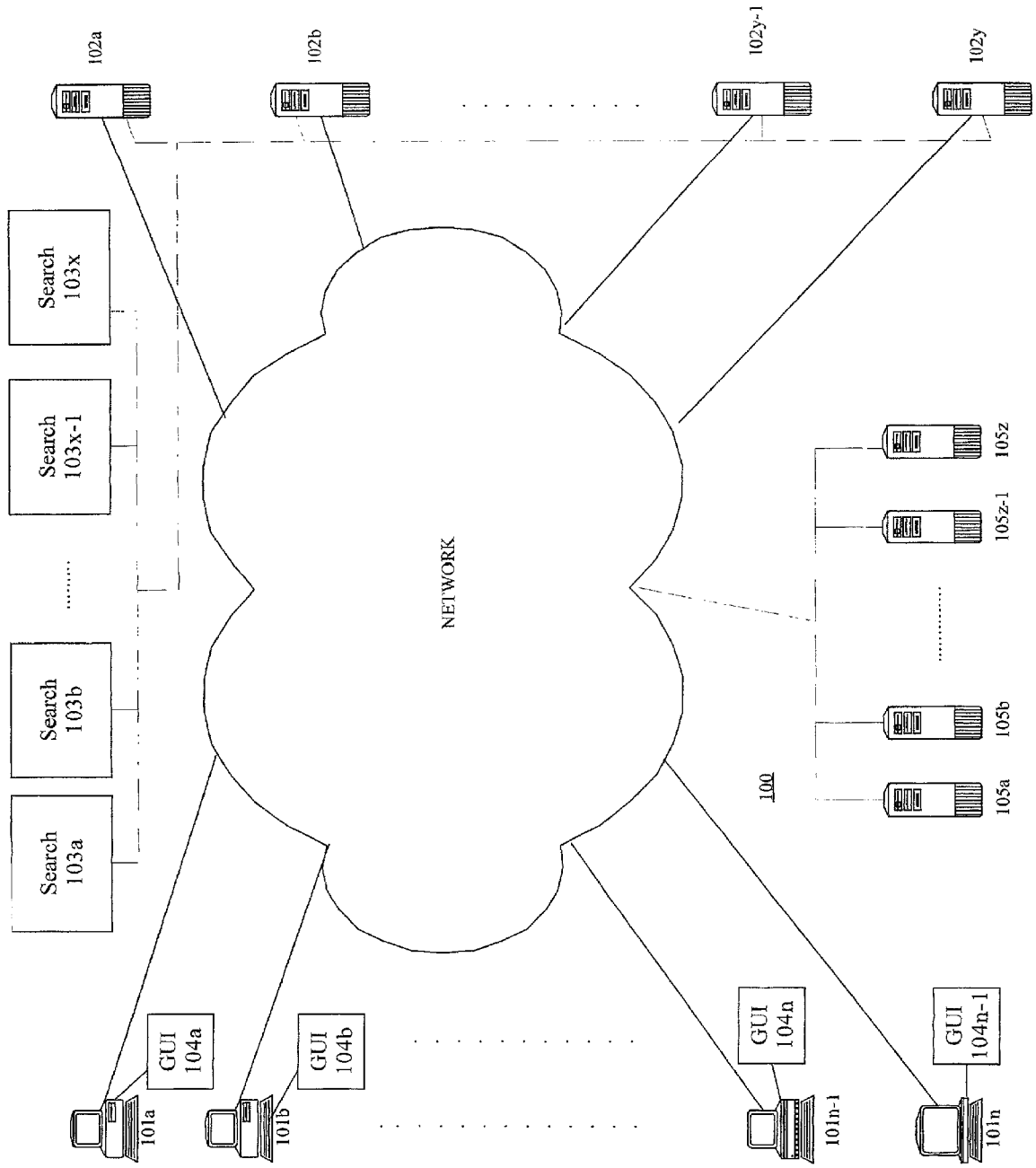
FIG. 1 is a system level overview of a typical information processing network within which the present invention may be practiced.

It is important to note that these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and vice versa with no loss of generality.

In the drawing like numerals refer to like parts through several views.

GLOSSARY OF TERMS USED IN THIS DISCLOSURE

Crawler—A program that automatically explores the World Wide Web by retrieving a document and recursively retrieving some or all the documents that are linked to it.

Dictionary—A database of context-related terms.

HTML (Hypertext Markup Language)—A standard language for attaching presentation and linking attributes to informational content within documents. During a document authoring stage, HTML "tags" are embedded within the informational content of the document. When the web document (or "HTML document") is subsequently transmitted by a web server to a web browser, the tags are interpreted by the browser and used to parse and display the document. In addition to specifying how the web browser is to display the document, HTML tags can be used to create hyperlinks to other web documents.

Internet—A collection of interconnected public and private computer networks that are linked together with routers by a set of standards protocols to form a global, distributed network.

Search engine—A remotely accessible World Wide Web tool that allows users to conduct keyword searches for information on the Internet.

Server—A software program or a computer that responds to requests from a web browser by returning ("serving") web documents.

URL (Uniform Resource Locator)—A unique address that fully specifies the location of a content object on the Internet. The general format of a URL is protocol:// server-address/path/filename.

Web browser—A software program that allows users to request and read hypertext documents. The browser gives some means of viewing the contents of web documents and of navigating from one document to another. Popular examples are Microsoft's Internet Explorer or Netscape's Navigator.

Web document or page—A collection of data available on the World Wide Web and identified by a URL. In the simplest, most common case, a web page is a file written in HTML and stored on a web server. It is possible for the server to generate pages dynamically in response to a request from the user. A web page can be in any format that the browser or a helper application can display. The format is transmitted as part of the headers of the response as a MIME type, e.g. "text/html", "image/gif". An HTML web page will typically refer to other web pages and Internet resources by including hypertext links.

Web Site—A database or other collection of inter-linked hypertext documents ("web documents" or "web pages") and associated data entities, which is accessible via a computer network, and which forms part of a larger, distributed informational system such as the WWW. In general, a web site corresponds to a particular Internet domain name, and includes the content of a particular organization. Other types of web sites may include, for example, a hypertext database of a corporate "intranet" (i.e., an internal network which uses standard Internet protocols), or a site of a hypertext system that uses document retrieval protocols other than those of the WWW.

World Wide Web (WWW): An Internet client-server hypertext distributed information retrieval system.

Exemplary Embodiment Information Processing Unit

Client 200

Figure 2:
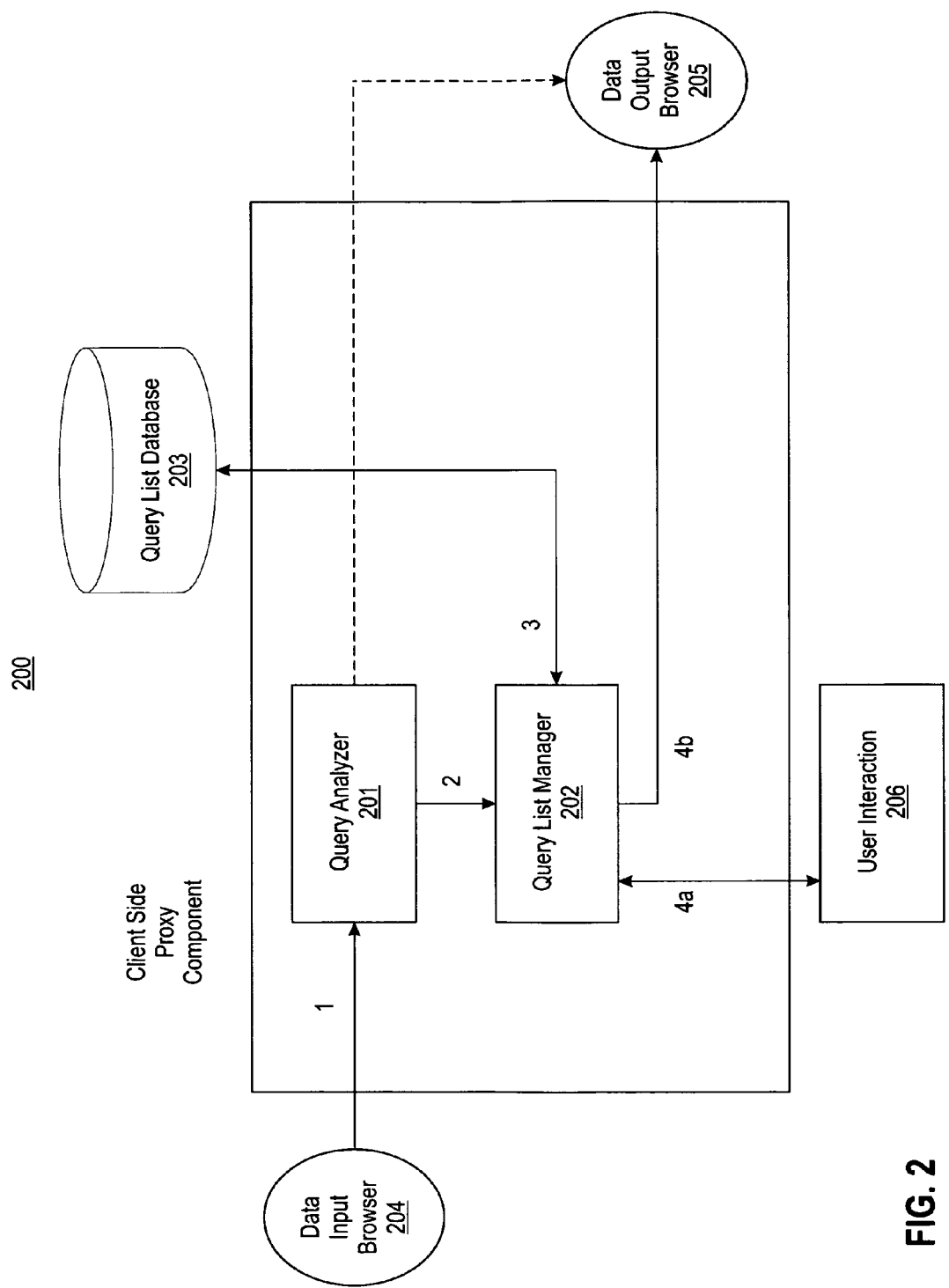
FIG. 2 is a block diagram of the major components of the client side proxy 200 executing on one of a plurality of information processing units of FIG. 1 in accordance with the present invention for search query sharing selection.

Referring to FIG. 2, a block diagram of the major components of the client side proxy 200 executing on one of a plurality of information processing units (101a to 101n) in accordance with the present invention for search query sharing selection. The client side proxy 200 is comprised of a Query Analyzer 201, and a Query List Manager 202. Also, shown are a Query List Database 203, a Data Input 204, a Data Output 205 and a User Interaction Line 206. The client side proxy 200 resides on the information processing unit (101a to 101n) as a plug-in or proxy on the graphical user interface or "web browser" The client proxy 200 or plug-in detects whether a search program query is performed. Next the client proxy 200 offers the user an opportunity to submit this query to the hub processing unit or "server" component of the invention. The client proxy 200 allows the user to submit a category within which the query resides along with a natural language description of the query itself.

Query Analyzer 201

The Query Analyzer component receives all requested URL strings and detects whether the particular URL represents a search query. Incoming URL's are directly received from the web browser, since the invention is implemented as a proxy (between the web browser and the World Wide Web, WWW) web browser plug-in. To determine whether a URL represents a query, an examination of the query string part. Typically, a search query is appended to a URL like this using the standard HTTP GET method:

http://www.altavista.com/cgi-bin/
   query?sc=on&q=origin+main+
   coon&k1=XX&pg=q&search.x=12&search.y=13

The "?" signals the start of a query string. In this case, the URL would be identified as a query string and forwarded to the Query List Manager 202 component. A second possibility is that the query is passed to the search engine using the HTTP POST method. In this case, the query string is passed to the search engine based on a character stream. The Query Analyzer 201 intercepts and store the stream to the appropriate URL record.

Query List Manager 202

Figure 11:
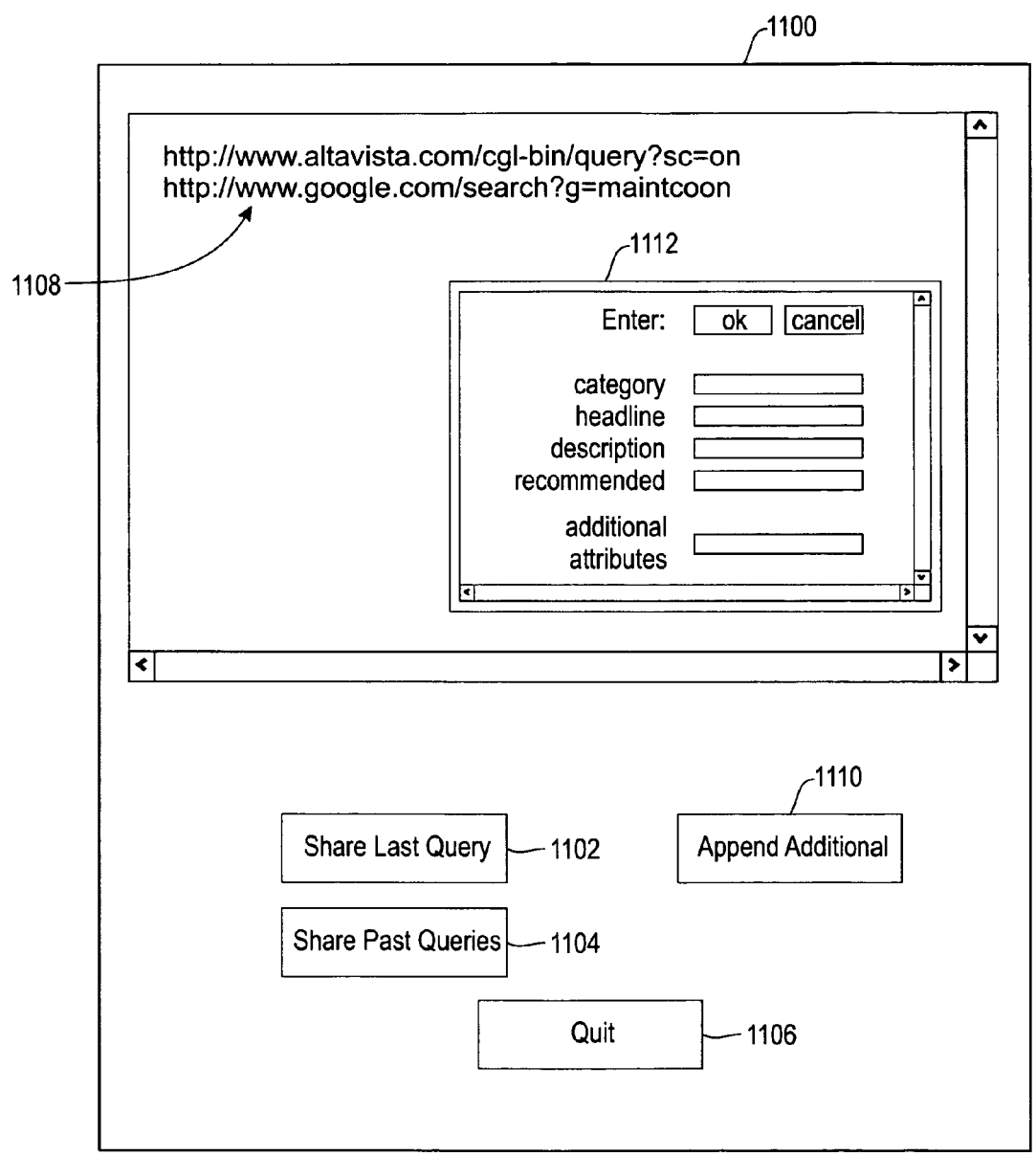
FIG. 11 is a block diagram that illustrates the Graphical User Interface presented to an information processing unit user for query selection sharing.

Once a query string is identified, it is received and stored in Query List Database 203 from the Query List Manager 202. Query List Manager 202 presents a Graphical User Interface (GUI) FIG. 11 to the user and provides a list 1108 of the query strings available for sharing. From this list, a user can select 1102-1104 a specific query string for sharing. The storage of the query strings in Query List Database 203 can be session based or permanent storage. If query sharing is selected, the user is able to specify additional information 1110 (e.g. Title, Description, and more.) to append to the query string along with a mandatory category label. After all data has been entered, the query and the appended information is forwarded to the hub processing unit.

Hub Processing Unit

Server 300

Figure 3:
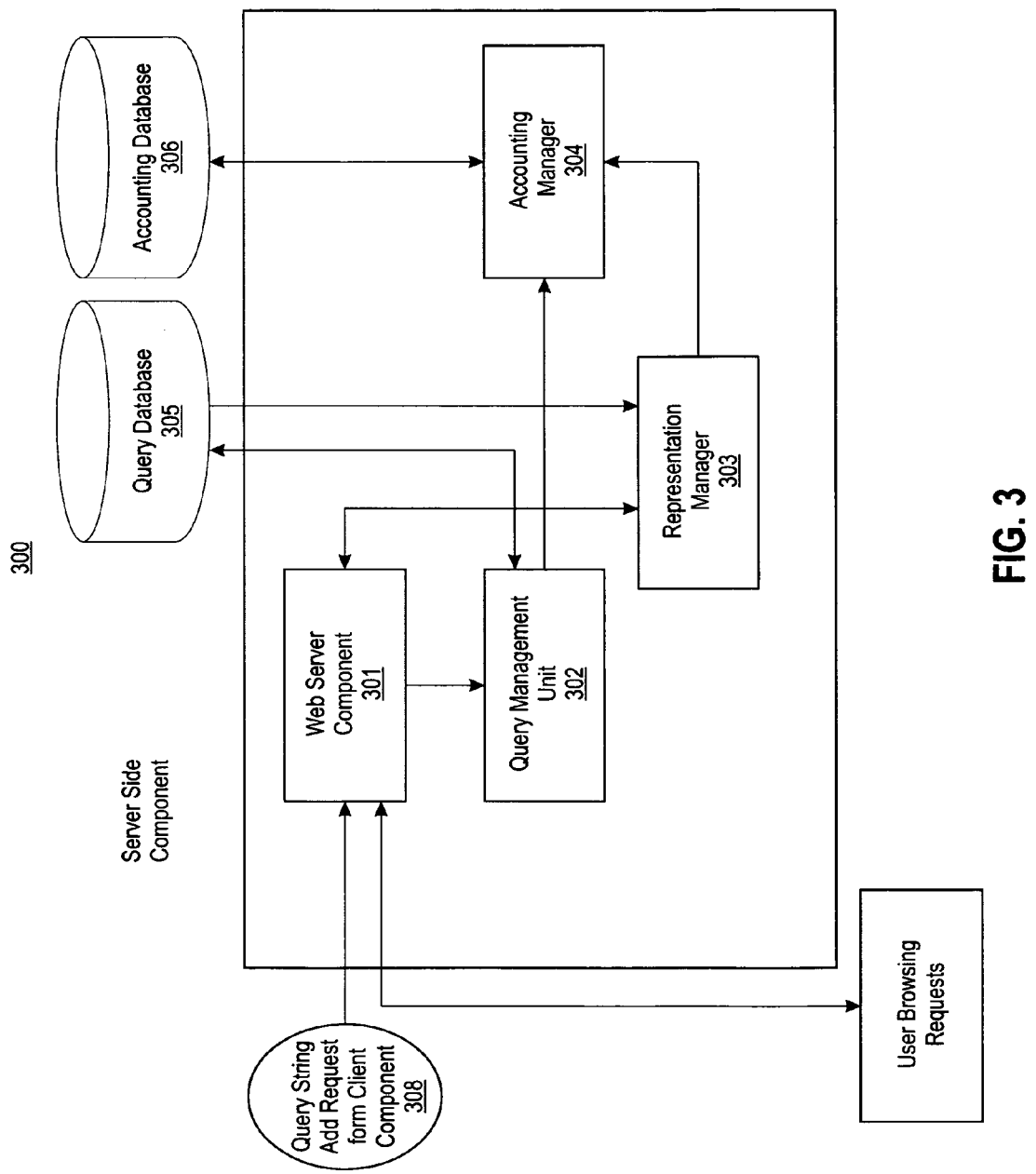
FIG. 3 is a block diagram of the major hub processing services running on the hub processing units of FIG. 1 for search query sharing and points awarding, according to the present invention.

Referring to FIG. 3, a block diagram 300 of the major hub processing services running on hub processing units (102a-102y) for search query sharing and points awarding. A hub processing unit is comprised of a Web Server Component 301, a Query Management Unit 302 a Representation Manager 303 and an Accounting Manager 304. Also shown are a Query Database 305, an Accounting Database 306, a user's Browsing Requests Input 307 and a Query String Add Request Line 308 from an information processing unit (101a to 101n). Other users are free to access the queries stored in Database 305 by submitting search requests through interface 307 and browsing through the results. Users can then issue a query easily by clicking on a hyperlink, to reuse and perform the query.

Web Server Component 301

Web Server Component 301 provides web server functionality, session management, (and more.) in order to provide a web based service. A query string from the client side component 200 is identified and forwarded to the Query Management Unit 302. The communication between the information processing units (101a to 101n) and the hub processing units 102 (a-y) of FIG. 1 (or server 300 of FIG. 3) is HTTP based. Essentially, the data can be passed using the HTTP POST method as described previously. In addition, a HTTP browse request is identified and the specific page forwarded to the Representation Manager 303.

Query Management Unit 302

Query Management Unit 302 interacts with the Web Server Component 301 and receives the query string along with the additional descriptive information appended to the query string by a user. Once the data is received, the data is examined to determine if it is valid and if it is, it is stored in the Query Database 305. The Query Management Unit notifies an optional Accounting Manager 304 that a user has submitted a query string thereby ensuring that user receives some recognition for his donation in the form of points or some other award.

Representation Manager 303

Figure 12:
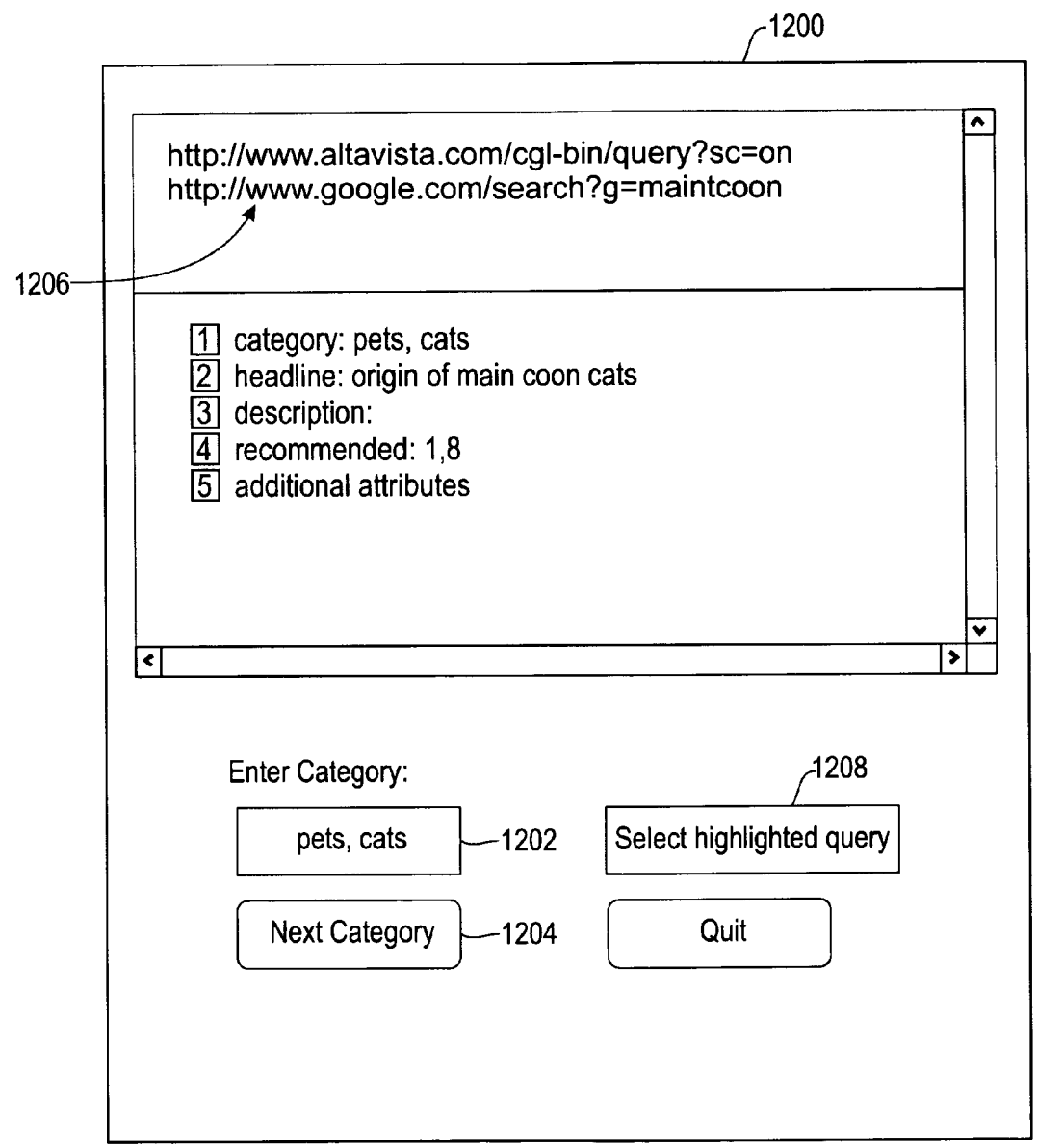
FIG. 12 is a block diagram that illustrates the Graphical User Interface presented to a hub processing unit user for the searching through and browsing of shared queries.

Representation Manager 303 provides a Graphical User Interface (GUI) FIG. 12 to the Query Database 305. Users are able to browse query strings by categories 1202. Representation Manager 303 receives data from the Query Database using standard web based database access, e.g., ASP (Active Server Pages) or JSP (Java Server Pages) and more. The data is embedded in web pages to provide a friendly user interface. If there is a selection 1208 of a search query hyperlink 1206, the Web Server Component 301 notifies the Accounting Manager 304. Therefore, the Accounting Manager provides some award to the user who submitted the query when it is accessed by another party. Furthermore, all data which is ready for presentation to the user is returned to the Web Server Component 301 for presentation to the user.

Accounting Manager 304

The Accounting Manager 304 is responsible for the proper book keeping of the awarding of points in lieu of a monetary reward. Optionally included in the system, this component keeps track of users who submit queries as well as those users whose queries are frequently accesses by other users.

Query Database 305

Query Database 305 stores all query strings received from the information processing units (101a to 101n) of FIG. 1 through client proxy 200.

Accounting Database 306

Accounting Database 306 stores information on users who submit queries as well as those users whose queries are frequently accessed by other users for the awarding of points by the Accounting Manager 304.

Information Processing Unit

Client 200 Functional Overview

Figure 4:
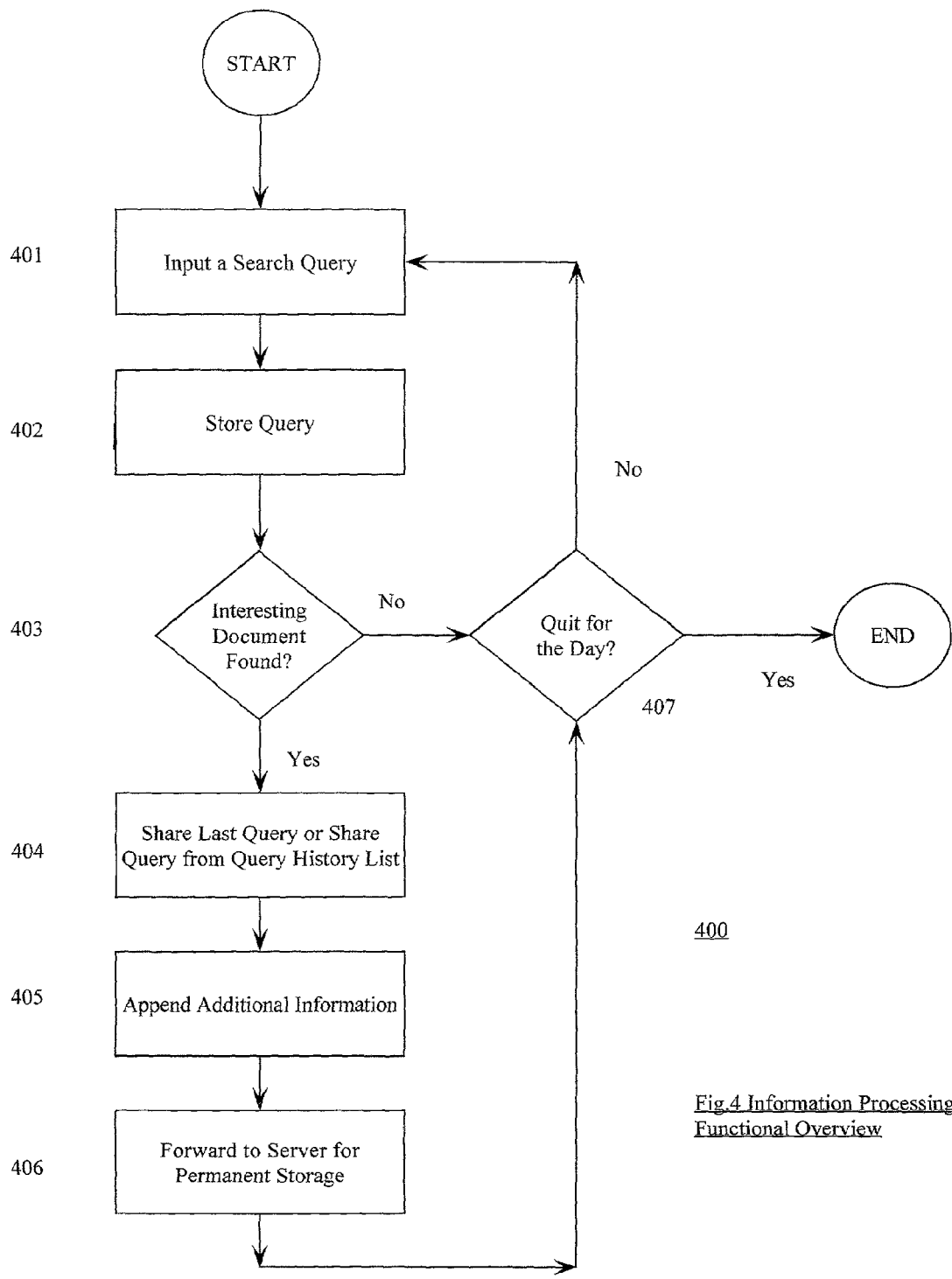
FIG. 4 is a flow diagram that illustrates the processing steps executed on an information processing unit to execute query selection sharing in accordance with the present invention.

Referring to FIG. 4, a flow diagram 400 that illustrates the processing steps executed on an information processing units (101a-101n) to execute query selection sharing in accordance with the present invention is shown. Returning now to the example search of "Maine Coon Cats Origin" found in the Background of the Invention except the following exemplifies the how the present invention shares queries. A user is searching for the origin of Maine Coon cats by inputting a search query 401. Every time the user performs a search the query string, for example
http://www.altavista.com/cgi-bin/query?sc=on&q=origin+main+coon&k1=XX&pg=q&search.x=12&search.y=13
is stored on the client side 402. After a certain period of time and after examining the search results, a user decides that he or she has not found an interesting document 403 then the process continues until he desires to quit for the day 407. Otherwise, if an important document was found using a particular search query than the user can simply click on a dialog pop-up button provided on a list Graphical User Interface FIG. 11 integrated web browser 1100 to select "Share last Query" 1102 or the user can select a query 1104 for sharing from a Query History List 404. Additional informational can be appended 1110 to the query by the user 405; the appended data can include Title, Description and other optional information but must include a Category for the search query. A dialog pop-up 1112 prompts for the following information as it relates to the selected query:

| | |
|---|---|
| 1. Category | pets, cats |
| 2. Headline | Origin of Maine Coon Cats |
| 3. Description | Article which discusses the origin of Maine Coon Cats |
| 4. Recommended | 1, 8 Search Result Items |
| 5. Additional Attributes | [optional] |

Then the data is forwarded to the server for permanent storage at 406.

Hub Processing Unit

Server 300 Functional Overview

Figure 5:
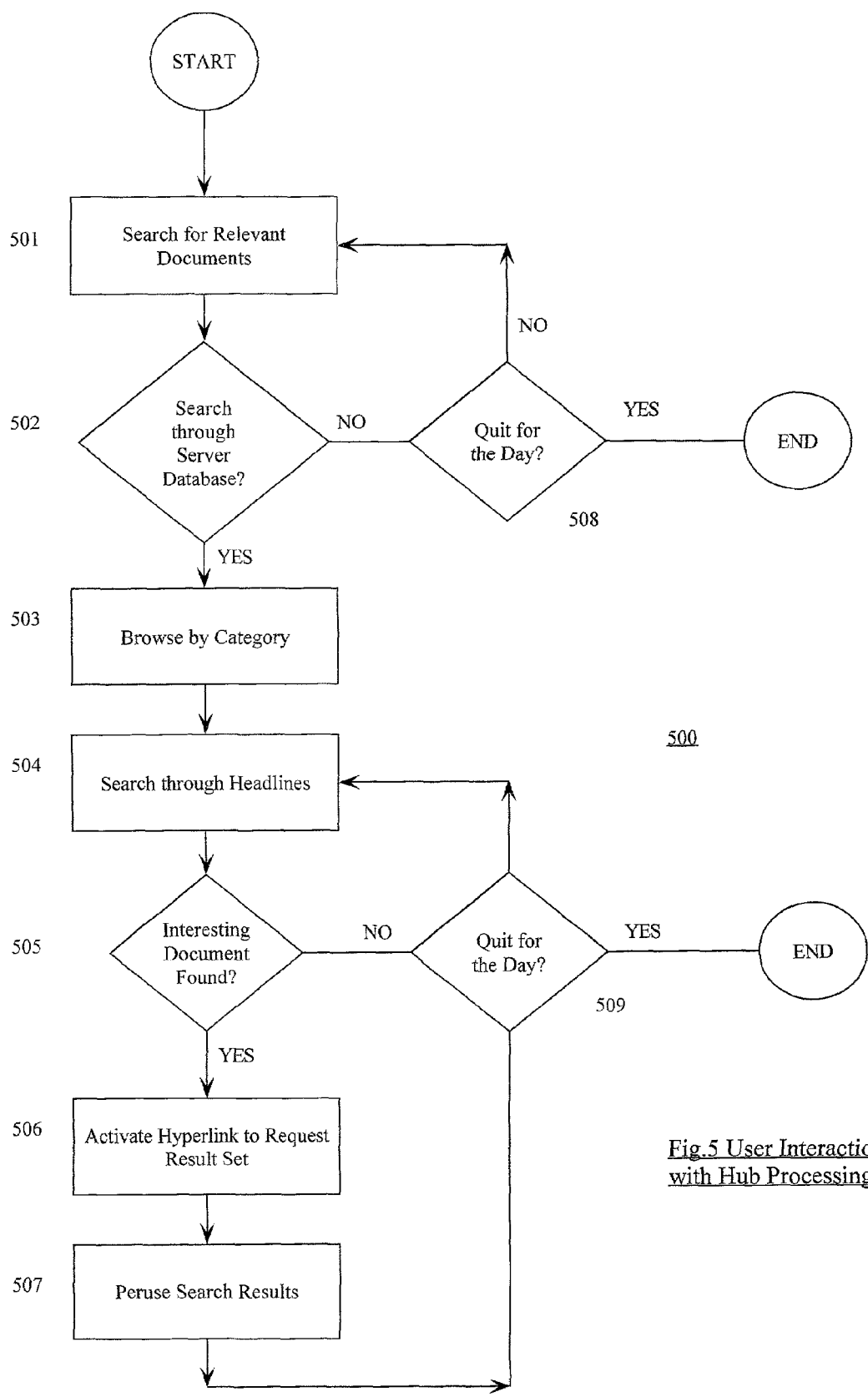
FIG. 5 is a flow diagram that illustrates the processing steps executed on a network hub processing unit to retrieve shared queries in accordance with the present invention.

Referring to FIG. 5, a flow diagram 500 that illustrates the processing steps executed on a network hub processing unit to retrieve shared queries in accordance with the present invention is shown. Another user begins to search for relevant documents about the origin of Maine Coon Cats at 501. He or she decides to search through the server database at 502 and begins browsing there by category (pets, cats) at 503; otherwise he may decide to quit at 508. Then he or she searches through the headlines 504. If a good document is found, the user activates a hyperlink to request a result set 506 and peruses the search results at 507; the user looks at the recommended search result items 1 and 8. If a relevant document is not found the user may decide to quit at 509. Of course, the service could provide search mechanisms to facilitate this process.

Information Processing Unit

Client Query Analyzer 201 Functional Overview

Figure 6:
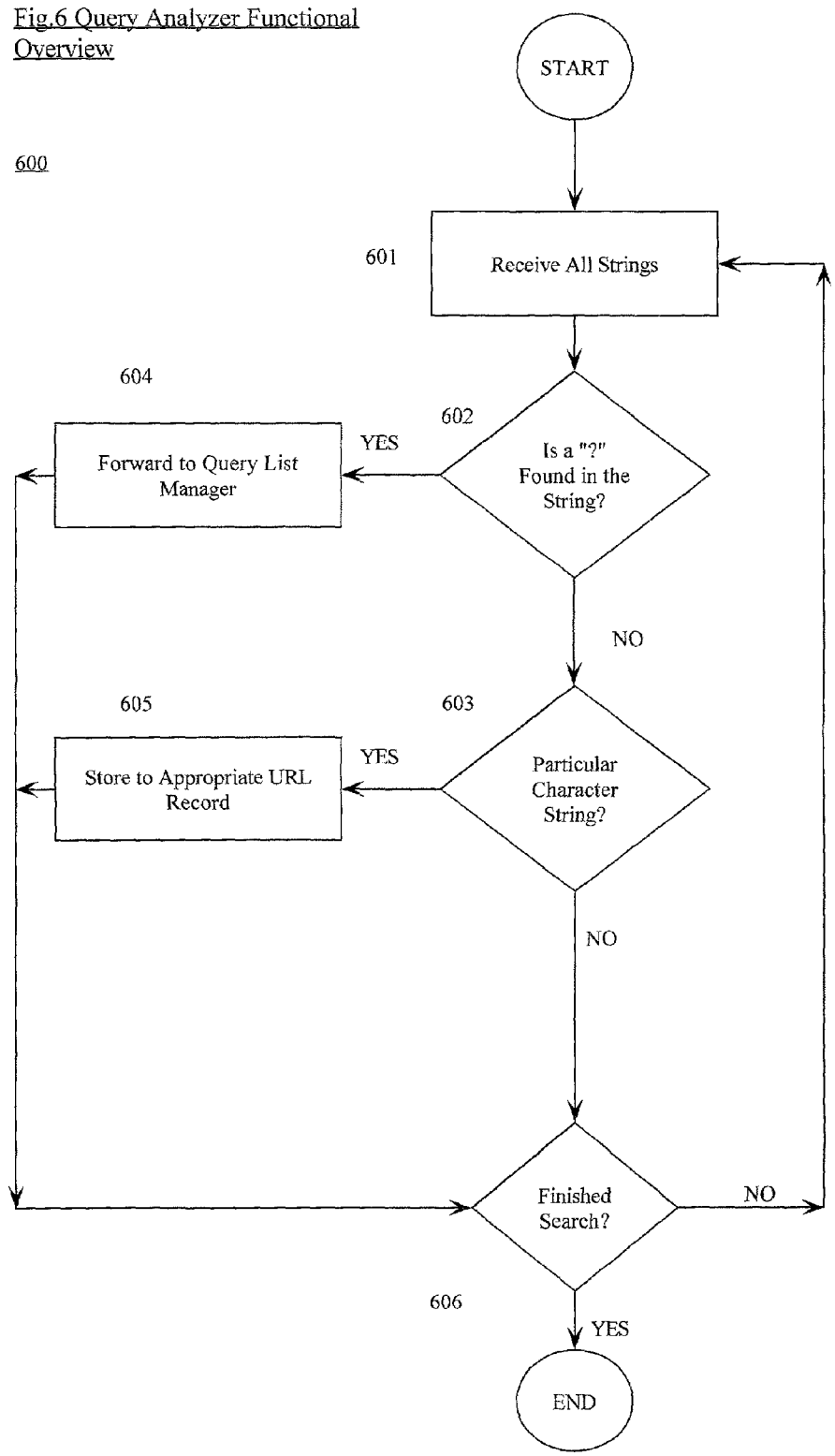
FIG. 6 is a flow diagram that illustrates the processing steps executed in an analyzer that determines if a string is a query in accordance with the present invention.

Referring to FIG. 6, a flow diagram 600 that illustrates the processing steps executed in an analyzer that determines if a string is a query in accordance with the present invention is shown. This component receives all requested URL strings

601 and detect whether the particular URL represents a search query. Incoming URL's are directly received from the web browser, since the invention is implemented as a proxy (between the web browser and the World Wide Web, WWW) web browser plug-in. To determine whether a URL represents a query, an examination is made of the query string part. Typically, a search query is appended to a URL like this using the standard HTTP GET method:

http://www.altavista.com/cgi-bin/
        query?sc=on&q=origin+main+
        coon&k1=XX&pg=q&search.x=12&search.y=13

The "?" signals the start of a query string. In this case, the URL would be identified as a query 602 string and forwarded to the Query List Manager 202 component 604. A second possibility is that the query is passed to the search engine using the HTTP POST method. In this case, the query string be passed to the search engine based on a character stream 603. The Query Analyzer 201 will intercept and store the stream to the appropriate URL record 605. The process ends or continues depending upon whether or not there are more strings to be examined 606.

Information Processing Unit

Client Query List Manager 202 Functional Overview

Figure 7:
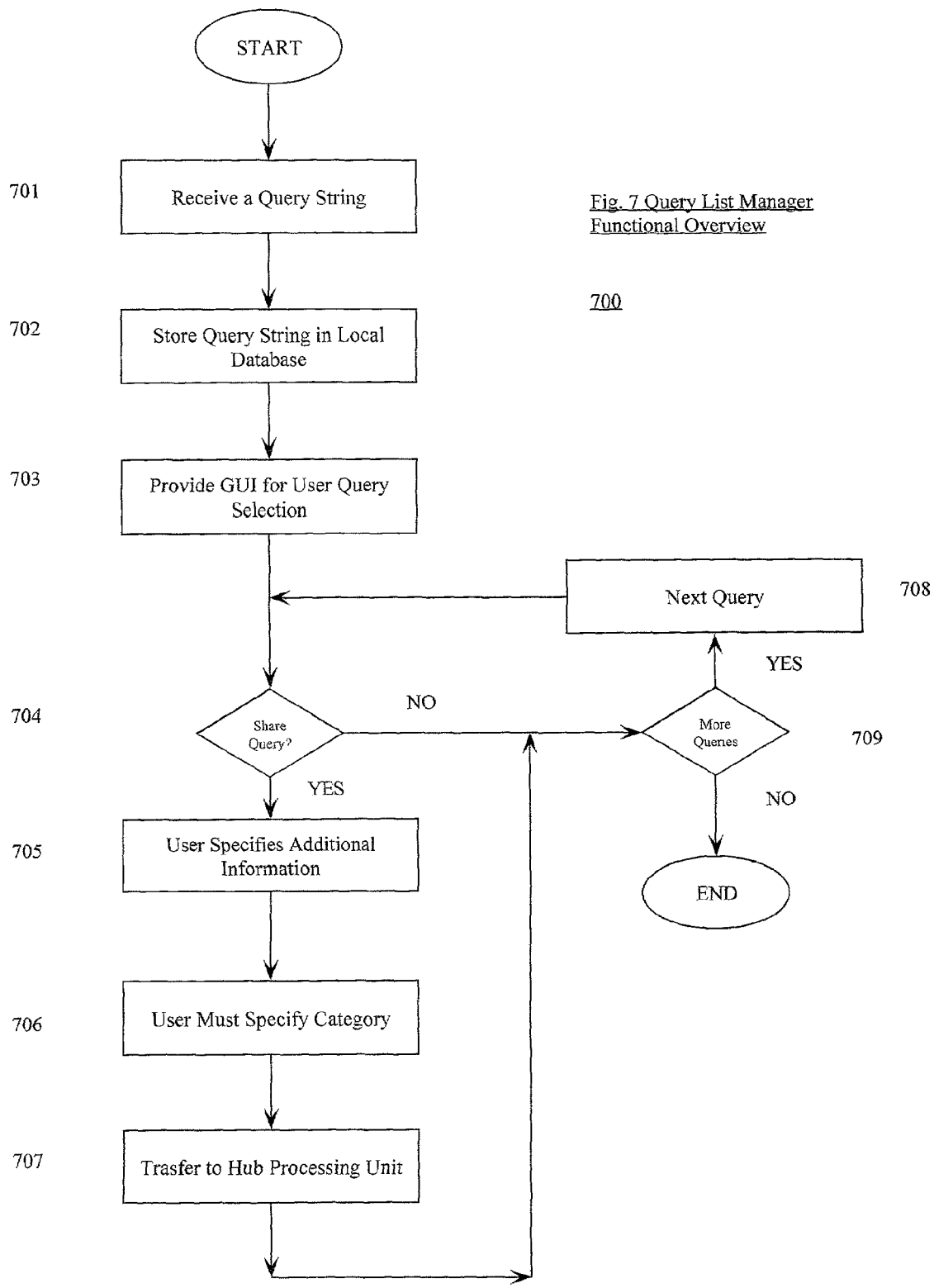
FIG. 7 is a flow diagram that illustrates the processing steps executed to select queries for sharing in accordance with the present invention.

Referring to FIG. 7, a flow diagram 700 that illustrates the processing steps executed to select queries for sharing in accordance with the present invention is depicted. Once a query string is identified, it will be received 701 and stored 702 in Query List Database 203 from the Query List Manager 202. This component will present a Graphical User Interface (GUI—FIG. 11) 1100 to the user and provides a list 1108 of the query strings available for sharing 703. From this list, a user can select 1102-1104 a specific query string for sharing 704. The storage of the query strings in Query List Database 203 can be session based or permanent storage. If query sharing is selected, the user is able to specify additional information 705 (e.g. Title, Description, and more.) to append 1110 to the query string along with a mandatory category label 706. After all data has been entered, the query and the appended information is forwarded to the server 300—hub processing unit at 707. If after indicating that a query will not be shared the user wishes to stop entering queries then the process ends; otherwise, one continues on to more queries 709.

Hub Processing Unit 300

Web Server Component 301 Functional Overview

Figure 8:
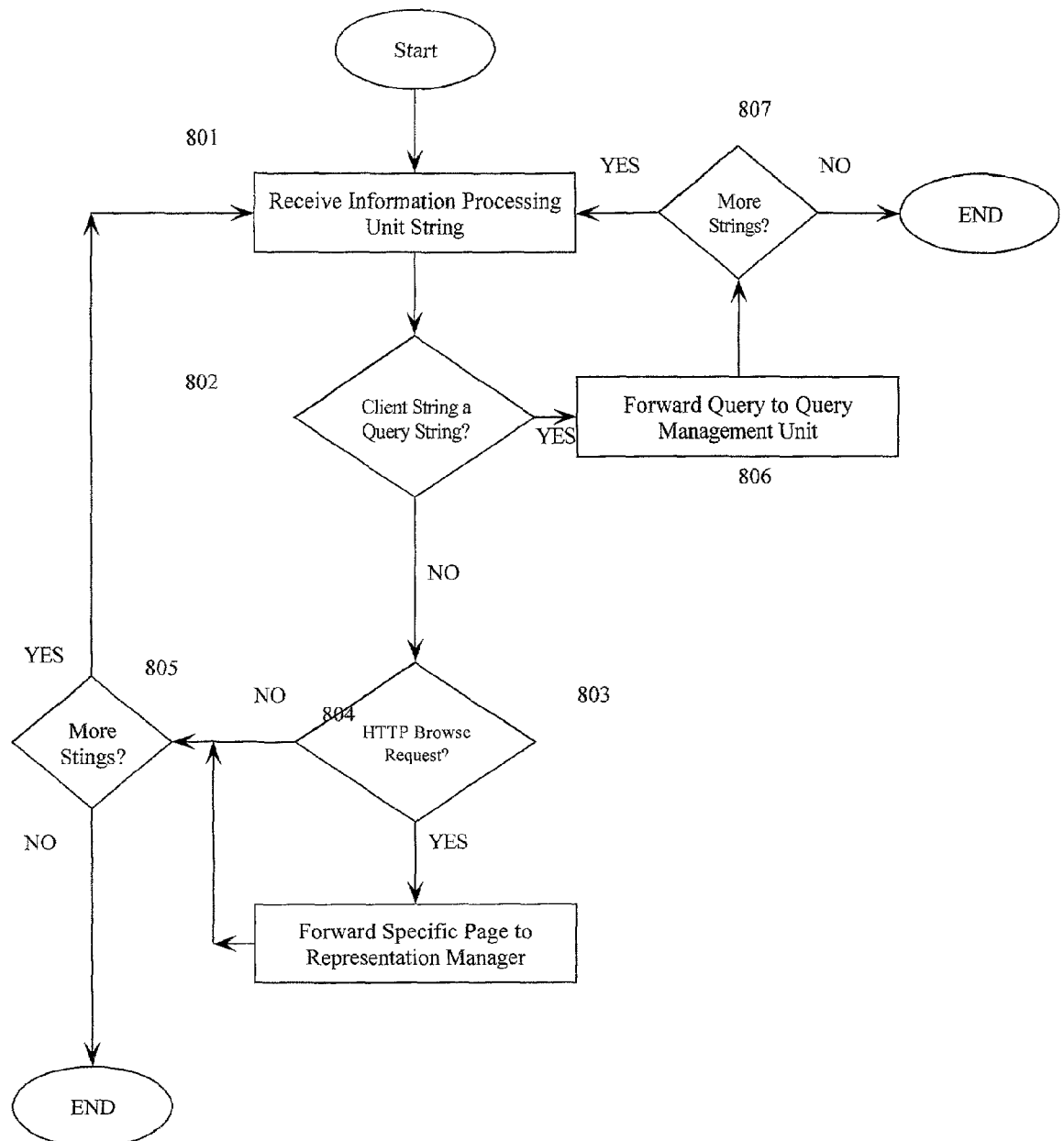
FIG. 8 is a flow diagram that illustrates the processing steps executed in a web server component in accordance with the present invention.

Referring to FIG. 8, a flow diagram 800 that illustrates the processing steps executed in a web server component 301 in accordance with the present invention is depicted. This component will provide web server functionality, session management, (and more.) in order to provide a web based service. A query string from the client side component 200 will be received 801, identified 802 and forwarded 806 to the Query Management Unit 302. The communication between the information processing units 101 (*a-n*) of FIG. 1 (or client 200 of FIG. 2) and the hub processing units 102 (*a-y*) of FIG. 1 (or server 300 of FIG. 3) is HTTP based. Essentially, the data can be passed using the HTTP POST method as described previously. In addition, a HTTP browse request will be identified 803 and the specific page forwarded 804 to the Representation Manager 303. The process ends or continues depending upon whether or not there are more strings to be examined 805 and 807.

Hub Processing Unit 300

Query Management Unit 302 Functional Overview

Figure 9:
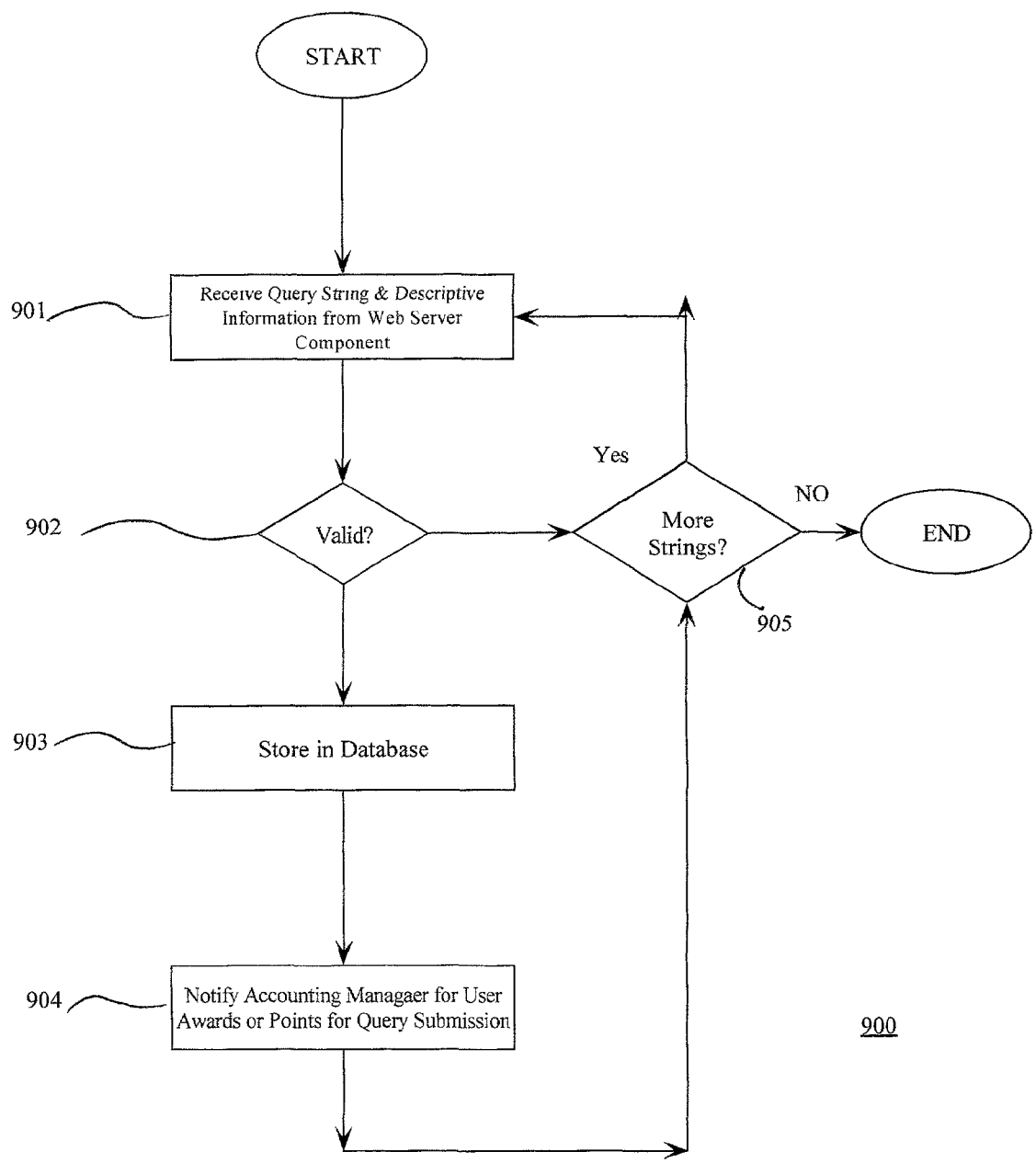
FIG. 9 is a flow diagram that illustrates the processing steps executed in a management unit for the storage of queries in the hub processing units and the awarding of points for submission of queries in accordance with the present invention.

Referring to FIG. 9, a flow diagram 900 that illustrates the processing steps executed in a management unit for the storage of queries in the hub processing units and the awarding of points for submission of queries in accordance with the present invention is depicted. This unit interacts with the Web Server Component 301 and receives the query string 901 along with the additional descriptive information appended to the query string by a user. Once the data is received, it will be examined to determine if it is valid 902 and if it is, it is stored 903 in the Query Database 305. The Query Management Unit 302 validates the string in two ways. First the string is checked to see if it contains an address of a search engine, i.e., a search URL. Secondly, the syntax of the string is checked to see if it is a search. Returning to the search example, the query "Maine Coon" on the web search engine Google would look first for the www.google.com in the string and second search for the "?" in the URL for the query string:

http://www.google.com/search?q=maine+
        coon&meta=lr%3D%26hl%3Den

Next, the Query Management Unit 302 notifies 904 an optional Accounting Manager 304 that a user has submitted a query string thereby ensuring that user receives some recognition for his donation in the form of points or some other award. The process ends or continues depending upon whether or not there are more strings to be examined 905.

Hub Processing Unit 300

Representation Manager 303 Functional Overview

Figure 10:
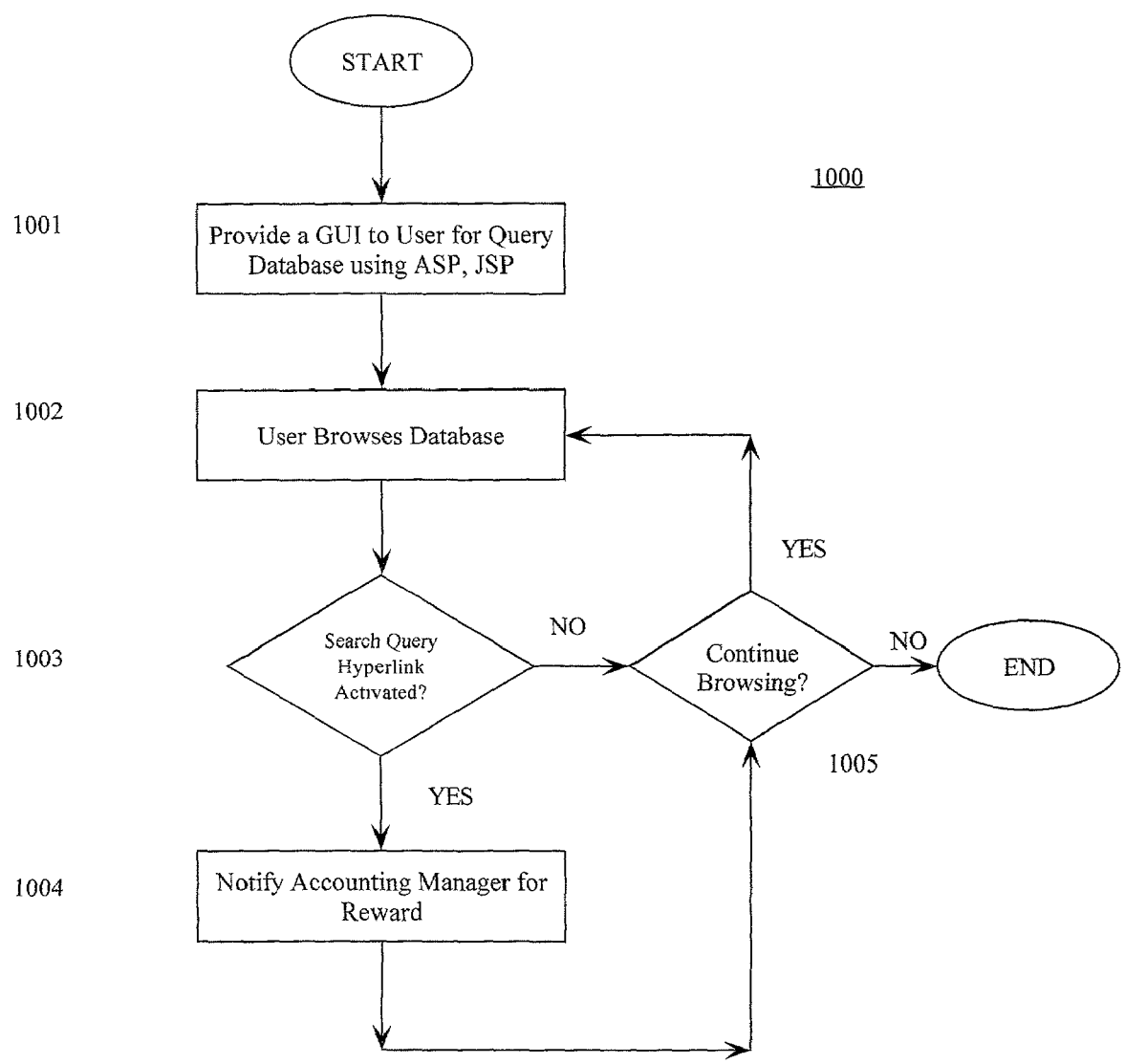
FIG. 10 is a flow diagram that illustrates the processing steps executed for the searching of the selected shared queries and the rewarding of points for the accessing of a selected shared query at the hub processing unit in accordance with the present invention.

Referring to FIG. 10, a flow diagram 1000 that illustrates the processing steps executed for the searching of the selected shared queries and the rewarding of points for the accessing of a selected shared query at the hub processing unit in accordance with the present invention is shown. This unit provides 1001*a* Graphical User Interface (GUI—FIG. 12) to the Query Database 305. Users are able to browse 1002 query strings by categories 1202. It will receive data from the Query Database using standard web based database access, e.g., ASP (Active Server Pages) or JSP (Java Server Pages) and more. The data will be embedded in web pages to provide a friendly user interface. If there is a selection (1208) 1003 of a search query hyperlink 1206, the Web Server Component 301 will notify 1004 the Accounting Manager 304. Therefore, the Accounting Manager will provide some award to the user who submitted the query when it is accessed by another party. Furthermore, all data which is ready for presentation to the user will be returned to the Web Server Component 301 for presentation to the user. If the user continues to browse then the process repeats itself or else it terminates 1005.

Discussion of Hardware and Software Implementation Options

The present invention, as would be known to one of ordinary skill in the art could be produced in hardware or software, or in a combination of hardware and software. The system, or method, according to the inventive principles as disclosed in connection with the preferred embodiment, may be produced in a single computer system having separate elements or means for performing the individual functions or steps described or claimed or one or more elements or means combining the performance of any of the functions or steps disclosed or claimed, or may be arranged in a distributed computer system, interconnected by any suitable means as would be known by one of ordinary skill in art.

According to the inventive principles as disclosed in connection with the preferred embodiment, the invention and the inventive principles are not limited to any particular kind of computer system but may be used with any general purpose computer, as would be known to one of ordinary skill in the art, arranged to perform the functions described and the method steps described. The operations of such a computer, as described above, may be according to a computer program contained on a medium for use in the operation or control of the computer, as would be known to one of ordinary skill in the art. The computer medium which may be used to hold or contain the computer program product, may be a fixture of the computer such as an embedded memory or may be on a transportable medium such as a disk, as would be known to one of ordinary skill in the art.

The invention is not limited to any particular computer program or logic or language, or instruction but may be practiced with any such suitable program, logic or language, or instructions as would be known to one of ordinary skill in the art. Without limiting the principles of the disclosed invention any such computing system can include, inter alia, at least a computer readable medium allowing a computer to read data, instructions, messages or message packets, and other computer readable information from the computer readable medium. The computer readable medium may include non-volatile memory, such as ROM, Flash memory, floppy disk, Disk drive memory, CD-ROM, and other permanent storage. Additionally, a computer readable medium may include, for example, volatile storage such as RAM, buffers, cache memory, and network circuits.

Furthermore, the computer readable medium may include computer readable information in a transitory state medium such as a network link and/or a network interface, including a wired network or a wireless network, that allow a computer to read such computer readable information.

What is claimed is:

1. A method of sharing queries in a hub processing unit coupled to a plurality of information processing units over a network, the method on the information processing unit comprising the steps of:
   receiving a Uniform Resource Locator (URL) string from a first user,
   determining if the URL string represents a query, if the URL string represents a query, performing the sub-steps of:
   storing the query in a query database;
   forwarding the query to a hub processing unit in the event that the first user selects the query for sharing with a second user connected to the hub processing unit;
   storing information in an accounting database for awarding the first user for submitting the query for sharing; and
   receiving, from a second user, a selection for one of the stored queries for sharing.

2. The method as defined in claim 1, wherein the sub-step of forwarding further includes the sub-step of receiving from the second user, a selection of a query from a query history list.

3. The method as defined in claim 2, wherein the sub-step of forwarding further includes the sub-step of storing information in the accounting database for awarding the first user for submitting the query in response to the second user selecting the query from the query history list.

4. The method as defined in claim 1, wherein the determining step further includes the sub-step of analyzing the string for a particular character or characters to determine if the string is a query.

5. The method as defined in claim 1, wherein the sub-step of forwarding further comprises the sub-step of appending additional information from the first user to the shared query.

6. The method as defined in claim 5, wherein the appending step further includes appending additional information comprising category, title or descriptive information.

7. The method as defined in claim 1, wherein the storing sub-step further includes storing the query in an information processing unit wherein the storing is temporary or permanent storage.

8. The method as defined in claim 1, further comprising a step of repetitively processing incoming strings as long as strings are received from the user.

9. A method of sharing queries in a hub processing unit coupled to a plurality of client information processing units over a network, the method on the hub processing unit comprising the steps of:
   receiving a query selected for sharing by a first user of a client information processing system;
   storing the query;
   storing information in an accounting database for awarding the first user for submitting the query for sharing;
   receiving from a second user a selection of the query shared by the first user;
   performing the further sub-steps of:
   activating a hyperlink to request a search result set based upon the second user's selection of the hyperlink; and
   displaying the search result set for the second user.

10. The method as defined in claim 9, wherein the capturing step further comprises capturing searches made through headlines for documents.

11. The method as defined in claim 9, wherein the receiving step further includes a sub-step of validating a received query string.

12. The method as defined in claim 9, wherein the receiving step further includes a step of awarding at least one of a reward and points for at least one query submission by a user.

13. The method as defined in claim 12, wherein the awarding step further comprises notifying an accounting manager of the query submission.

14. A client information processing unit coupled via a network with a hub processing unit apparatus for sharing queries comprising:
   an input for receiving a Uniform Resource Locator (URL) string from a first user;
   a comparator for determining if the URL string represents a query;
   an interface for storing the query in an information processing unit memory;
   an output for forwarding the query to a hub processing unit in the event that the first user selects the query for sharing with a second user connected to the hub processing unit;
   an accounting database for storing information for awarding the first user for submitting the query for sharing; and
   an input for receiving, from a second user, a selection for one of the stored queries for sharing.

15. The client information processing unit as defined in claim 14, wherein the input further includes a selection device so that the first user selects a query from a query history list.

16. The client information processing unit as defined in claim 14, wherein the input further includes a selection device so that the first user selects a query from the received string that has been shown to be a query.

17. The client information processing unit as defined in claim 14, wherein the comparator includes an analyzer which analyzes the string for a particular character or characters to determine if the string is a query.

18. The client information processing unit as defined in claim 14, wherein the input further includes a graphical user interface that allows the first user to append additional information to the shared query.

19. The client information processing unit as defined in claim 18, wherein the graphical user interface further includes a pop-up dialog box that requests additional information comprising category, title or descriptive information.

20. The client information processing unit as defined in claim 14, wherein the information processing unit memory further includes permanent or temporary memory.

21. A server for sharing queries in a client-server network comprising:
    an input means for receiving from a client over a network, a query selected by a first user for sharing;
    interface means for storing the query received;
    means for searching through queries by a second user;
    means for finding an interesting shared query by the second user;
    means for activating a hyperlink to request a result set if the shared query is of value to the second user;
    means for awarding the first user for selecting the query for sharing; and
    means for perusing the search result set if the shared query is of value to the second user.

22. A computer readable medium including programming instructions, the programming instructions including instructions for query sharing in a client server network comprising:
    reception instructions for receiving a Uniform Resource Locator (URL) string from a first user;
    determination instructions for determining if the URL string represents a query;
    storing instructions for storing the query in a client computer if the URL string represents a query;
    forwarding instructions for forwarding the query to a server in the event that the URL string represents a query and the first user selects a query for sharing with a second user connected to the hub processing unit;
    storing information in an accounting database for awarding the first user for submitting the query for sharing; and
    receiving, from a second user, a selection for one of the stored queries for sharing in the database.

23. The computer readable medium of claim 22, further comprising instructions for selective sharing of URLs.

* * * * *